(12) United States Patent
Kondreddy et al.

(10) Patent No.: US 11,588,725 B2
(45) Date of Patent: *Feb. 21, 2023

(54) METHOD AND APPARATUS FOR PATH COMPUTATION

(71) Applicant: Huawei Technologies Co., Ltd., Shenzhen (CN)

(72) Inventors: Venugopal Reddy Kondreddy, Bangalore (IN); Mahendra Singh Negi, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,058

(22) Filed: May 17, 2021

(65) Prior Publication Data

US 2021/0273878 A1 Sep. 2, 2021

Related U.S. Application Data

(63) Continuation of application No. 16/621,135, filed as application No. PCT/CN2017/109135 on Nov. 2, 2017, now Pat. No. 11,038,792.

(30) Foreign Application Priority Data

Jan. 27, 2017 (IN) .............................. 201741003138

(51) Int. Cl.
*H04L 45/128* (2022.01)
*H04L 45/50* (2022.01)

(52) U.S. Cl.
CPC ............ *H04L 45/128* (2013.01); *H04L 45/50* (2013.01)

(58) Field of Classification Search
CPC .......... H04L 45/00; H04L 45/12–1287; H04L 45/20–28; H04L 45/50–586; H04L 45/60–68
See application file for complete search history.

(56) References Cited

U.S. PATENT DOCUMENTS

| 7,668,113 B2 | 2/2010 | Zhao et al. |
| 8,416,747 B2 | 4/2013 | Bai |
| 8,750,127 B2 | 6/2014 | Zhang et al. |

(Continued)

FOREIGN PATENT DOCUMENTS

| CN | 101146115 A | 3/2008 |
| CN | 101192990 A | 6/2008 |

(Continued)

OTHER PUBLICATIONS

Vasseur, JP., Ed., et al., "Path Computation Element (PCE) Communication Protocol (PCEP)," RFC 5440, Mar. 2009, 87 pages.

(Continued)

*Primary Examiner* — Chi H Pham
*Assistant Examiner* — Vladislav Y Agureyev
(74) *Attorney, Agent, or Firm* — Conley Rose, P.C.

(57) ABSTRACT

A method and apparatus for path computation includes generating a path computation element communication protocol (PCEP) message, whereby the PCEP message comprises a characteristic associated with a level of protection of a Protection Label Switch path (LSP) with a Working LSP; and transmitting the PCEP message for path computation.

20 Claims, 5 Drawing Sheets

(56) References Cited

U.S. PATENT DOCUMENTS

| | | | |
|---|---|---|---|
| 8,885,459 B2 | 11/2014 | Chen | |
| 8,885,463 B1 | 11/2014 | Medved et al. | |
| 8,897,140 B1 | 11/2014 | Bhattacharya | |
| 8,982,691 B2 | 3/2015 | Jain et al. | |
| 9,590,845 B1 | 3/2017 | Esale et al. | |
| 9,667,559 B2* | 5/2017 | Bhattacharya | H04L 45/22 |
| 10,382,334 B2* | 8/2019 | Previdi | H04L 69/166 |
| 11,356,356 B2* | 6/2022 | Skalecki | H04L 45/22 |
| 2007/0091796 A1 | 4/2007 | Filsfils et al. | |
| 2008/0219268 A1 | 9/2008 | Dennison | |
| 2009/0103442 A1 | 4/2009 | Douville | |
| 2009/0213726 A1 | 8/2009 | Asati et al. | |
| 2011/0007652 A1 | 1/2011 | Bai | |
| 2012/0076046 A1 | 3/2012 | Lin | |
| 2012/0089673 A1 | 4/2012 | Grammel | |
| 2012/0092986 A1 | 4/2012 | Chen | |
| 2013/0007266 A1 | 1/2013 | Jacho et al. | |
| 2013/0235716 A1 | 9/2013 | Vasseur | |
| 2014/0086570 A1 | 3/2014 | Rider et al. | |
| 2014/0092722 A1 | 4/2014 | Jain et al. | |
| 2014/0328587 A1* | 11/2014 | Magri | H04J 14/0271 398/34 |
| 2015/0003283 A1 | 1/2015 | Previdi et al. | |
| 2015/0172171 A1* | 6/2015 | Beller | H04Q 11/0066 398/45 |
| 2015/0222557 A1 | 8/2015 | Bhattacharya | |
| 2015/0249593 A1* | 9/2015 | Alvarez | H04L 45/124 370/241 |
| 2016/0006609 A1 | 1/2016 | Zhao | |
| 2017/0155575 A1 | 6/2017 | Bertucci et al. | |
| 2017/0155576 A1 | 6/2017 | Addeo et al. | |
| 2018/0048557 A1 | 2/2018 | Li et al. | |
| 2018/0123948 A1* | 5/2018 | Lin | H04L 41/00 |

FOREIGN PATENT DOCUMENTS

| | | | |
|---|---|---|---|
| CN | 101371150 A | 2/2009 | |
| CN | 101399771 A | 4/2009 | |
| CN | 101945048 A | 1/2011 | |
| CN | 101997765 A | 3/2011 | |
| CN | 103067275 A | 4/2013 | |
| CN | 101577661 B | 9/2013 | |
| CN | 103957159 A | 7/2014 | |
| CN | 104092611 A | 10/2014 | |
| CN | 104283781 A | 1/2015 | |
| CN | 105227461 A | 1/2016 | |
| CN | 105591861 A | 5/2016 | |
| EP | 2497233 B1 | 8/2013 | |
| EP | 2132892 B1 * | 2/2016 | H04J 14/0246 |
| WO | 2017190573 A1 | 11/2017 | |

OTHER PUBLICATIONS

Ananthakrishnan, H., et al., "PCEP Extensions for MPSL-TE LSP Path Protection with stateful PCE," draft-ananthakrishnan-pce-stateful-path-protection-01, Mar. 10, 2016, 12 pages.

Crabbe, E., et al., "PCEP Extensions for PCE-initiated LSP Setup in a Statefun PCE Model," draft-ietf-pce-pce-initiated-lsp-07, Jul. 18, 2016, 18 pages.

Kondreddy, V., et al., "Optimizations of PCEP Link-State(LS) Synchronization Procedures," draft-kondreddy-pce-pcep-ls-sync-optimizations-00, Oct. 9, 2015, 20 pages.

Minei, I., et al., "PCEP Extensions for Establishing Relationships Between Sets of LSPs," draft-minei-pce-association-group-02, Jul. 6, 2015, 11 pages.

Farrel, A., Ed., "Encoding of Attributes for MPLS LSP Establishment Using Resource Reservation Protocol Traffic Engineering (RSVP-TE)," RFC 5420, Feb. 2009, 22 pages.

Crabbe, E., et al., "Path Computation Element Communication Protocol (PCEP) Extensions for Stateful PCE," RFC 8231, Sep. 2017, 57 pages.

Litkowski, S., et al "Path Computation Element communication Protocol extension for signaling LSP diversity constraint," draft-ietf-pce-association-diversity-00, Jan. 27, 2017, 11 pages.

Litkowski, S., et al., "Path Computation Element communication Protocol extension for signaling LSP diversity constraint," draft-litkowski-pce-association-diversity-01, Jan. 27, 2017, 11 pages.

Ramon Casellas, et al, "A Path Computation Element for Shared Path Protection in GMPLS-enabled Wavelength Switched Optical Networks," ECOC 2008, Sep. 21-25, 2008, Brussels, Belgium, 2 pages.

I. Minei et al, "PCEP Extensions for Establishing Relationships Between Sets of LSPs," draft-ietf-pce-association-group-02, Jan. 9, 2017, 15 pages.

Xian Zhang et al., "Path Computation Element (PCE) Protocol Extensions for Stateful PCE, Usage in GMPLS-controlled Networks," draft-ietf-pce-pcep-stateful-pce-gmpls-02.txt, Jan. 8, 2015, 17 pages.

E. Crabbe, et al., "PCEP Extensions for Stateful PCE," draft-ietf-pce-stateful-pce-18, Dec. 2, 2016, 60 pages.

Liang Kaile, "Research on Pce-Based Resource Computation Approach in Multi-Domain Networks," Beijing University of Posts and Telecommunications, 2012, with an English Abstract, 59 pages.

* cited by examiner

Network deployment scenario:

METHOD AND APPARATUS FOR PATH COMPUTATION

CROSS-REFERENCE TO RELATED APPLICATIONS

This is a continuation of U.S. patent application Ser. No. 16/621,135, filed on Dec. 10, 2019, which is a national stage application of Int'l Patent App. No. PCT/CN2017/109135, filed on Nov. 2, 2017, which claims priority to Indian Patent App. No. 201741003138, filed on Jan. 27, 2017, all of which are incorporated by reference.

FIELD

This invention relates to telecommunications, in particular, to a method and apparatus for path computation in a network.

BACKGROUND

Time critical applications like public switched telephone network (PSTN) calls are affected when the network re-converges due to faults. In PSTN, the communications, segmented and encapsulated packets are routed using Internet Protocol (IP) or switched using Multiprotocol Label Switching (MPLS) to the remote end destinations. For example, MPLS traffic engineering (TE) software enables an MPLS backbone to replicate and expand packets upon the traffic engineering capabilities of Layer 2 ATM and Frame Relay networks. In MPLS network, Label Switched Path (LSP) protection is a technique used to guarantee the service availability of the communications.

As conventionally known, a Path Computation Element (PCE) solves the specific issue of inter-domain path computation for MPLS-TE LSP when the head-end router does not possess full network topology information. PCE uses area border routers (ABRs) to compute a TE LSP spanning multiple Interior Gateway Protocol (IGP) areas as well as computation of Inter-AS (Autonomous System) TE LSP. A PCE represents a software module (which can be a component or application) that enables the router to compute paths by applying a set of constraints between any pair of nodes within the router's TE topology database. PCEs are discovered through the IGP. A Path Computation Client (PCC) represents a software module running on a router that is capable of sending a path computation request to the PCE and receiving a response from the PCE. The PCC is typically an LSR (Label Switching Router). Path Computation Element Protocol (PCEP) is PCC-PCE communication protocol which is a Transmission Control Protocol (TCP)-based protocol defined by the IETF PCE WG (Work Group), and defines a set of messages and objects used to manage PCEP sessions and to request and send paths for multi-domain TE LSPs. PCEP is used for communication between PCC and PCE (as well as between two PCEs) and employs IGP extensions to dynamically discover PCE.

Stateful PCE is a PCE that has access to not only the network state, but also to the set of active paths and their reserved resources for its computations. The stateful PCE also retain information regarding LSPs under construction in order to reduce churn and resource contention. In PCE managed network, where the PCC and the PCE operates in a stateful mode, the PCC can delegate the control of both the working and the protection LSPs to PCE. The Working LSP is the primary LSP backed up by the protection LSP. When a Working LSP goes down, the protection LSP is automatically activated. The PCC groups the working and protection LSPs with the association object in the report messages. So that PCE can compute the LSPs for both working and protection LSPs accordingly.

The PCE may have local configuration to set the desired level of protection for the protection LSP on a per LSP basis or a global configuration, and this configuration can be considered in Protection LSP computation.

The above-described deficiencies of existing communication networks/nodes of the networks/network devices in case of path computation are merely intended to provide an overview of some of the problems of conventional systems/mechanism/techniques, and are not intended to be exhaustive. Other problems with conventional systems/mechanism/techniques and corresponding benefits of the various non-limiting embodiments described herein may become further apparent upon review of the following description.

SUMMARY

An object of the present invention is to provide a method, apparatus and system to convey a characteristic of a Protection LSP between a PCC and a PCE thereby avoiding the PCE to compute primary and protection path sharing the same risk resulting in path protection failure resulting in traffic loss.

Another object of the present invention is to provide a system, device and a method that defines one or more protocol extensions to the Path Protection Association Type Length Value (TLV) which is an optional TLV within Association Object.

According to a first aspect, a method is provided. According to the method, a Path Computation Client (PCC) generates a path computation element communication protocol (PCEP) message to report association information, the PCC transmits the PCEP message to a Path Computation Element (PCE), for path computation. Wherein the PCEP message comprises a characteristic associated with a level of protection for a protected label switch path (LSP).

In a first possible implementation of the method according to the first aspect, wherein the characteristic comprises one or more of (1) that the Protection LSP is shared risk link group (SRLG) disjoint with the working LSP, (2) that the Protection LSP is link disjoint with the working LSP, (3) that the Protection LSP is node disjoint with the working LSP, (4) that the Protection LSP is bandwidth protected with the working LSP, and (5) that the Protection LSP is best effort disjointed with the working LSP.

In a second possible implementation of the method according to the first aspect, wherein the PCEP message comprises an association object, the association object includes a path protection association-flag Type Length Value (TLV) field, the path protection association-flag TLV field is configured to carry the characteristic.

In a third possible implementation of the method according to the first aspect, wherein the PCEP message comprises a Label Switch Path Attributes (LSPA) object field, the LSPA object includes an attribute TLV field, and the attribute TLV field of the LSPA object is configured to carry the characteristic.

In a forth possible implementation of the method according to the first aspect, wherein the PCEP message is a path computation request (PCReq) message or a path computation report (PCRpt) message.

According to a second aspect, a method is provided. According to the method, a Path Computation Element (PCE) generates a path computation element communication protocol (PCEP) message. The PCE transmits the PCEP message to a Path Computation Client (PCC) to set up the Protection LSP. The PCE receives a path computation report (PCRpt) message from the PCC, wherein the PCEP message comprises a first characteristic associated with a level of protection for a protection Label Switch Path (LSP), and the PCRpt message is configured to report a second characteristic associated with a level of protection of the Protection LSP set up by the PCC.

In a first possible implementation of the method according to the second aspect, wherein the PCEP message comprises an association object, the association object includes a path protection association-flag Type Length Value (TLV) field, the path protection association-flag TLV field is configured to carry the first characteristic.

In a second possible implementation of the method according to the second aspect, wherein the PCEP message comprises a Label Switch Path Attributes (LSPA) object field, the LSPA object includes an attribute TLV field, and the attribute TLV field of the LSPA object is configured to carry the first characteristic.

In a third possible implementation of the method according to the second aspect, the PCEP message is an update (PCUpd) message or an initiate (PCInitiate) message.

In a fourth possible implementation of the method according to the second aspect, wherein the PCRpt message comprises an association object, the association object is configured to carry the second characteristic.

In a fifth possible implementation of the method according to the second aspect, wherein the PCRpt message comprises a Label Switch Path Attributes (LSPA) object field, the LSPA object includes an attribute TLV field, and the attribute TLV field of the LSPA object is configured to carry the second characteristic.

In a sixth possible implementation of the method according to the second aspect, wherein the characteristic comprises one or more of: (1) that the Protection LSP is shared risk link group (SRLG) disjoint with the working LSP, (2) that the Protection LSP is link disjoint with the working LSP, (3) that the Protection LSP is node disjoint with the working LSP, (4) that the Protection LSP is bandwidth protected with the working LSP, and (5) that the Protection LSP is best effort disjointed with the working LSP.

According to a third aspect, a Path Computation Client (PCC) is provided. The PCC includes a processor and a transmitter coupled to the processor. The processor is configured to generate a path computation element communication protocol (PCEP) messages to report an association information, wherein the PCEP message comprises a characteristic associated with a level of protection for a protection label switch path (LSP). The transmitter is configured to transmit the PCEP message to the PCE) for path computation.

In a first possible implementation of the PCC according to the third aspect, wherein the characteristic comprises one or more of (1) that the Protection LSP is shared risk link group (SRLG) disjoint with the working LSP, (2) that the Protection LSP is link disjoint with the working LSP, (3) that the Protection LSP is node disjoint with the working LSP, (4) that the Protection LSP is bandwidth protected with the working LSP, and (5) that the Protection LSP is best effort disjointed with the working LSP.

In a second possible implementation of the PCC according to the third aspect, wherein the PCEP message comprises an association object, the association object includes a path protection association-flag Type Length Value (TLV) field, the path protection association-flag TLV field is configured to carry the characteristic.

In a third possible implementation of the PCC according to the third aspect, wherein the PCEP message comprises a Label Switch Path Attributes (LSPA) object field, the LSPA object includes an attribute TLV field, and the attribute TLV field of the LSPA object is configured to carry the characteristic.

In a fourth possible implementation of the PCC according to the third aspect, wherein the PCEP message is a path computation request (PCReq) message or a path computation report (PCRpt) message.

According to a fourth aspect, a Path Computation Element (PCE) is disclosed. The PCE includes a processor and a transmitter coupled to the processor. The processor is configured to generate a path computation element communication protocol (PCEP) message, wherein the PCEP message comprises a first characteristic associated with a level of protection for a protection label switch Path (LSP). The transmitter is configured to transmit the PCEP message to a Path Computation Client (PCC), to set up the Protection LSP. The receiver is configured to receive a path computation report (PCRpt) message from the PCC, wherein the PCRpt message is configured to report a second characteristic associated with a level of protection of the protection LSP set up by the PCC.

In a first possible implementation of the PCE according to the fourth aspect, wherein the PCEP message comprises an association object, the association object includes a path protection association-flag Type Length Value (TLV) field, the path protection association-flags TLV field is configured to carry the first characteristic.

In a second possible implementation of the PCE according to the fourth aspect, the PCEP message is an update (PCUpd) message or an initiate (PCInitiate) message.

In a third possible implementation of the PCE according to the fourth aspect, wherein the PCRpt message comprises an association object, the association object is configured to carry the second characteristic.

In a fourth possible implementation of the PCE according to the fourth aspect, wherein the characteristic comprises one or more of (1) that the Protection LSP is shared risk link group (SRLG) disjoint with the working LSP, (2) that the Protection LSP is link disjoint with the working LSP, (3) that the Protection LSP is node disjoint with the working LSP, (4) that the Protection LSP is bandwidth protected with the working LSP, and (5) that the Protection LSP is best effort disjointed with the working LSP.

According to the fifth aspect, a PCC is provided, the PCC includes:

a processing unit, configured to generate a path computation element communication protocol (PCEP) message to report an association information, wherein the PCEP message comprise a characteristic associated with a level of protection for a protection label switch path (LSP); and a transmitting unit, configured to transmit the PCEP message to the PCE for path computation.

In a possible implementation according to the fifth aspect, the characteristic comprises one or more of (1) that the Protection LSP is shared risk link group (SRLG) disjoint with the working LSP, (2) that the Protection LSP is link disjoint with the working LSP, (3) that the Protection LSP is node disjoint with the working LSP, (4) that the Protection LSP is bandwidth protected with the working LSP, and (5) that the Protection LSP is best effort disjointed with the working LSP.

In a possible implementation according to the fifth aspect, the PCEP message comprises an association object, the association object includes a path protection association-flag Type Length Value (TLV) field, the path protection association-flag TLV field is configured to carry the characteristic.

In a possible implementation according to the fifth aspect, the PCEP message comprises a Label Switch Path Attributes (LSPA) object field, the LSPA object includes an attribute TLV field, and the attribute TLV field of the LSPA object is configured to carry the characteristic.

In a possible implementation according to the fifth aspect, the PCEP message comprises a Label Switch Path Attributes (LSPA) object field, the LSPA object includes an attribute TLV field, and the attribute TLV field of the LSPA object is configured to carry the characteristic.

In a possible implementation according to the fifth aspect, the PCEP message is a path computation request (PCReq) message or a path computation report (PCRpt) message.

According to the sixth aspect, a PCE is provided, the PCE includes:

a processing unit, configured to generate a path computation element communication protocol (PCEP) message, wherein the PCEP message comprise a first characteristic associated with a level of protection for a protection label switch Path (LSP);

a transmitting unit, configured to transmit the PCEP message to a Path Computation Client (PCC), to set up the Protection LSP, and a receiving unit, configured to receive a path computation report (PCRpt) message from the PCC, wherein the PCRpt message is configured to report a second characteristic associated with a level of protection of the protection LSP set up by the PCC.

In a possible implementation according to the sixth aspect, the PCEP message comprises an association object, the association object includes a path protection association-flag Type Length Value (TLV) field, the path protection association-flag TLV field is configured to carry the first characteristic.

In a possible implementation according to the sixth aspect, the PCEP message is an update (PCUpd) message or an initiate (PCInitiate) message.

In a possible implementation according to the sixth aspect, the PCRpt message comprises an association object, the association object is configured to carry the second characteristic.

In a possible implementation according to the sixth aspect, the characteristic comprises one or more of (1) that the Protection LSP is shared risk link group (SRLG) disjoint with the working LSP, (2) that the Protection LSP is link disjoint with the working LSP, (3) that the Protection LSP is node disjoint with the working LSP, (4) that the Protection LSP is bandwidth protected with the working LSP, (5) that the Protection LSP is best effort disjointed with the working LSP.

According to the seventh aspect, a computer readable storage medium, encoded with instructions that when executed by a controller perform the method as described in any of the preceding paragraphs.

According to various, but not necessarily all, embodiments of the invention there is provided a computer program that, when executed by a controller, performs the method as described in any of the preceding paragraphs.

In contrast to the available techniques, the present invention enables to convey the characteristic of the Protection LSP between PCC and PCE. Each characteristic provides an information of the association of the Protection LSP with the Working LSP.

The present invention defines new bits in a TLV of an object to specify one or more characteristics of the Protection LSP. This enables the PCC to report the one or more characteristics of Protection LSP to the PCE. The PCE update message and/or the PCE initiate message may include the one or more characteristics of Protection LSP. The path computation request may carry the one or more attributes including flags defined in the present invention to be taken into account by the PCE during path computation.

The various options and preferred embodiments referred to above in relation to the first implementation are also applicable in relation to the other implementations.

Figure 1:
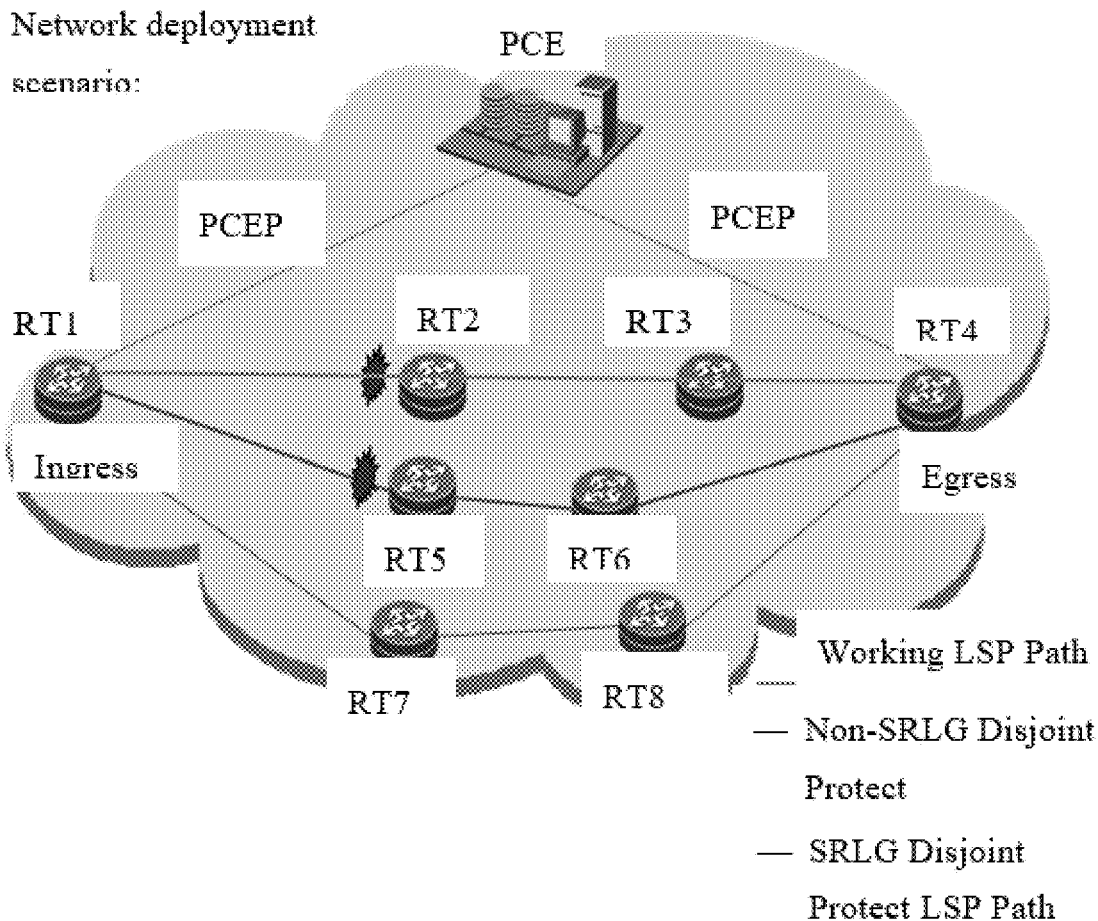
FIG. 1 illustrates a schematic diagram of a network deployment scenario according to the embodiment of the present invention.

It is to be understood that the attached drawings are for purposes of illustrating the concepts of the invention and may not be to scale.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The invention can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. For the purpose of clarity, technical material that is known in the technical fields related to the invention has not been described in detail so that the invention is not unnecessarily obscured.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

A PCE may have local configuration to set the desired level of protection for the protection LSP on a per LSP basis or a global configuration, and this configuration may be considered in Protection LSP computation. However, the PCC in the conventional art does not have mechanisms to provide a characteristic of Protection LSP to PCE. Further, the stateful PCE path protection IETF draft ("PCEP Extensions for Establishing Relationships Between Sets of LSPs", https://tools.ietf.org/html/draft-minei-pce-association-group-02) does not provide any mechanisms to specify a certain characteristic associated with the level of protection for Protection LSP. i.e., level of protection for Protection LSP can be shared risk link group (SRLG) disjoint, link disjoint, node disjoint, bandwidth or best effort disjoint path.

Referring now to FIG. 1, a network includes a PCE and routers acting as PCCs: RT1, RT2, RT3, RT4, RT5, RT6, RT7 and RT 8. The PCE establishes stateful PCE Protocol (PCEP) connections with RT1 to RT8, respectfully. For the sake of simplicity, a PCEP connection is shown to RT1 and RT4. There exists an MPLS-TE tunnel between RT1 and RT4 routers. The Working LSP from RT1 to RT4 is RT1-RT2-RT3-RT4, and there are 2 possible Protection LSPs available, i.e., RT1-RT5-RT6-RT4 and RT1-RT7-RT8-RT4. Some or all of the links along the path RT1-RT5-RT6-RT4 share the same SRLG as Working LSP (RT1-RT2-RT3-RT4), i.e., failure of the link sharing same risk as Working LSP links. Therefore, the path RT1-RT5-RT6-RT4 is not suitable for Protection LSP. Since none of the links along the path RT1-RT7-RT8-RT4 share same SRLG as Working LSP, the path RT1-RT7-RT8-RT4 is more appropriate to be a Protection LSP.

According to the stateful PCE Path Protection draft, the Working and the Protection LSPs could be initiated by a PCE or a PCC. In case a PCE initiates, the Working and the Protection LSPs are created/updated/deleted independently by the PCE, and the association group may be created by either the PCC or the PCE. Whereas in case the PCC initiates, the association group may be created and managed by the PCC. The association group is a grouping of LSPs in the context of stateful PCE. This grouping can be used to define associations between sets of LSPs or between a set of LSPs and a set of attributes (such as configuration parameters or behaviors), and is applicable to the active and passive modes of a stateful PCE.

Figure 2:
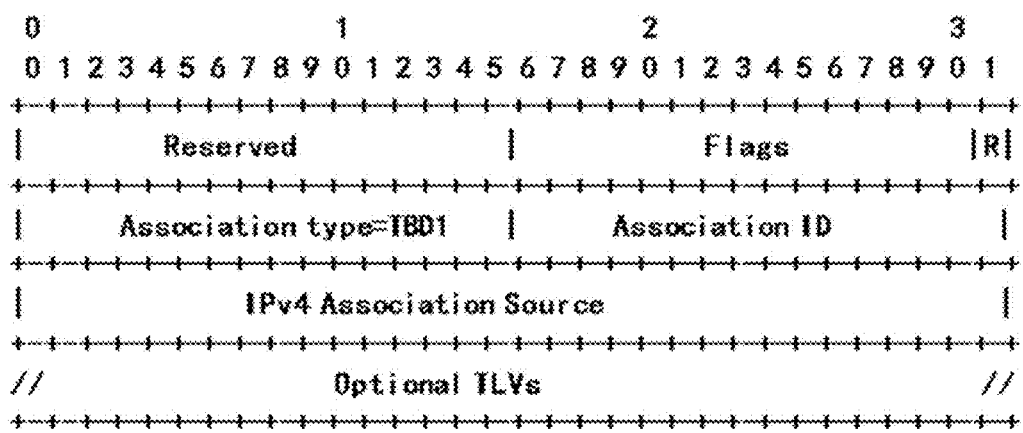
FIG. 2 illustrates a schematic diagram of a path protection association object according to the embodiment of the present invention.
Figure 3:
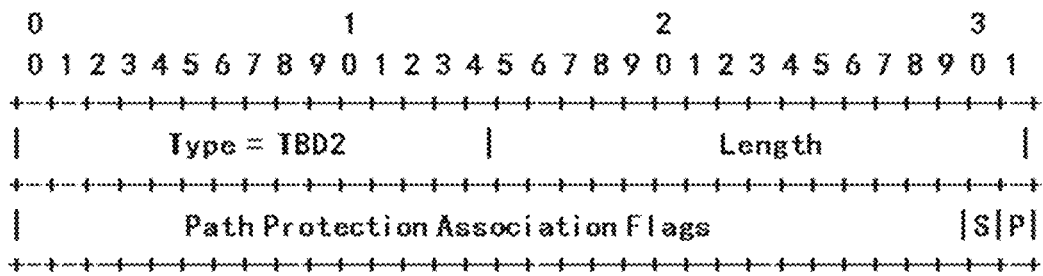
FIG. 3 illustrates a schematic diagram of a path protection association TLV according to the embodiment of the present invention.

However, in both the cases, the PCC reports the change of association information to the PCE through Path Computation Report (PCRpt) message, but, the current association object does not convey a characteristic of the Protection LSP. FIG. 2 illustrates a format of an IPv4 Path protection association object. The IPv4 Path protection association object includes an association type called "Path Protection Association Type" with a value TBD1 (may be assigned by IANA (the Internet Assigned Numbers Authority)). The association group may have one Working LSP and one or more protection LSPs. FIG. 3 illustrates a format of a Path Protection Association TLV, and the Path Protection Association TLV is an optional TLV in the IPv4 Path protection association object.

As shown in FIG. 3, the Type is a TBD2 for the path protection association type. The 'P' Flag indicates whether the LSP associated with the association group is a working LSP or a protection LSP. If this flag is set to 1, the LSP is a protection LSP, if the P flag is set to 1, the 'S' flag indicates whether the protection LSP associated with the association group is in a standby mode (e.g., signaled via RSVP-TE prior to failure), i.e., if the 'S' flag is set to 1, the protection LSP associated with the association group is in a standby mode. The S flag is ignored if the P flag is set to 0.

Figure 4:
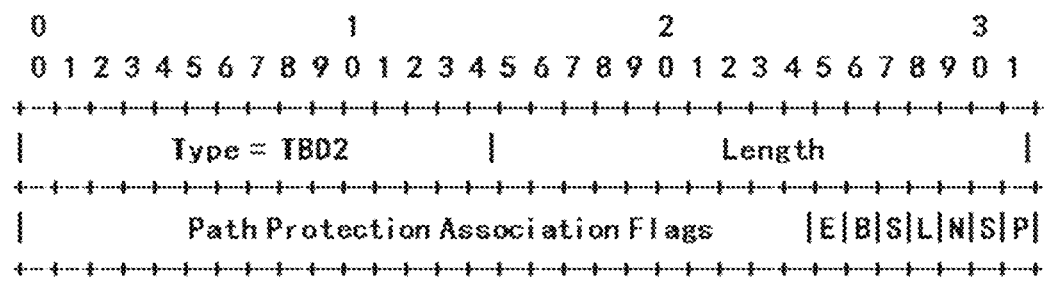
FIG. 4 illustrates a schematic diagram of a modified path protection association TLV according to the embodiment of the present invention.

In one embodiment of the present invention, in order to convey the characteristics associated with a level of protection of the Protection LSP between a PCC and a PCE, a path protection association TLV is provided. The format of the path protection association TLV is shown in FIG. 4. Following bits may be defined in the path protection association TLV in FIG. 4:

N bit represents—a Protection LSP is node disjoint with a Working LSP.

L bit represents—a Protection LSP is link disjoint with a Working LSP.

S bit represents—a Protection LSP is a SRLG (Shared Risk Link Group) disjoint with a Working LSP.

B bit represents—a Protection LSP is bandwidth protected with a Working LSP.

E bit represents—a Protection LSP is best effort disjointed with Working LSP.

In one implementation, in case the PCC initiates Protection LSP, based on local policy configured, the PCC may choose to send PCE Error message (PCErr) to the PCE when the PCE computes the Protection LSP which does not satisfy these characteristics specified in the association object of Report (PCRpt) message for the Protection LSP.

In one implementation, in case the PCE initiates Protection LSP, the PCE may specify the characteristics of the Protection LSP in association object in a Path Computation Update (PCUpd) or a Path Computation Initiate (PCInitiate) message to the PCC, and the PCC sets up the Protection LSP and PCRpt message reports association information to the PCE.

In one implementation, in case of passive stateful or stateless PCE, the PCC can specify these characteristics in an optional association object carried in the Path Computation Request (PCReq) message. When the association object is carried in a Path Computation Request message, the association object is used to associate the path computation request to an association group, the association might be further informed by the PCC via a report (PCRpt) message to the PCE in case of passive stateful PCE later when the LSP set up is finished.

Figure 5:
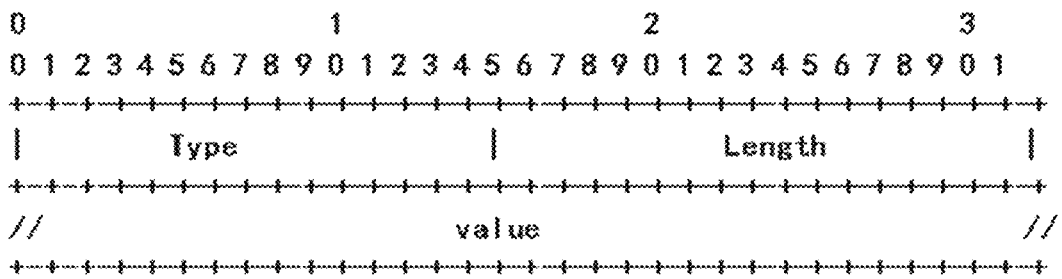
FIG. 5 illustrates a schematic diagram of an attributes TLV according to the embodiment of the present invention.

In one embodiment of the present invention, the new bits representing the one or more characteristics of the Protection LSP may be carried in an optional attribute TLV of a Label Switch Path Attributes (LSPA) object. The attribute TLV is defined in RFC 5420 and the format of the TLV is as shown in FIG. 5.

In one implementation, the LSPA object can be optionally included in a Path Computation Request (PCReq) message, a Path Computation Report (PCRpt) message, a Path Computation Update (PCUpd) message or a Path Computation Initiate (PCInitiate) message to specify LSP attributes. The LSPA object may be carried in a Path Computation PCReq message that specifies TE LSP attributes to be taken into account by the PCE during path computation. Optionally, the LSPA object may be carried in a PCRpt message, reports the LSP attributes to the PCE. When the LSPA Object is carried in a PCUpd message or a PCInitiate message, the PCE may instruct the PCC to set attributes of LSP.

In one implementation, the bit numbers to be carried in the Path Protection Association TLV and the LSPA object may be allocated by IANA.

Though the embodiments of the invention are described primarily in the context of the PCC and the PCE in a network, it shall be appreciated that the invention is not limited to the context of the PCC and the PCE, and may relate to any type of appropriate electronic apparatus having the function of path computation.

The embodiments of the present invention are described as follows in reference to the drawings.

Figure 6A:
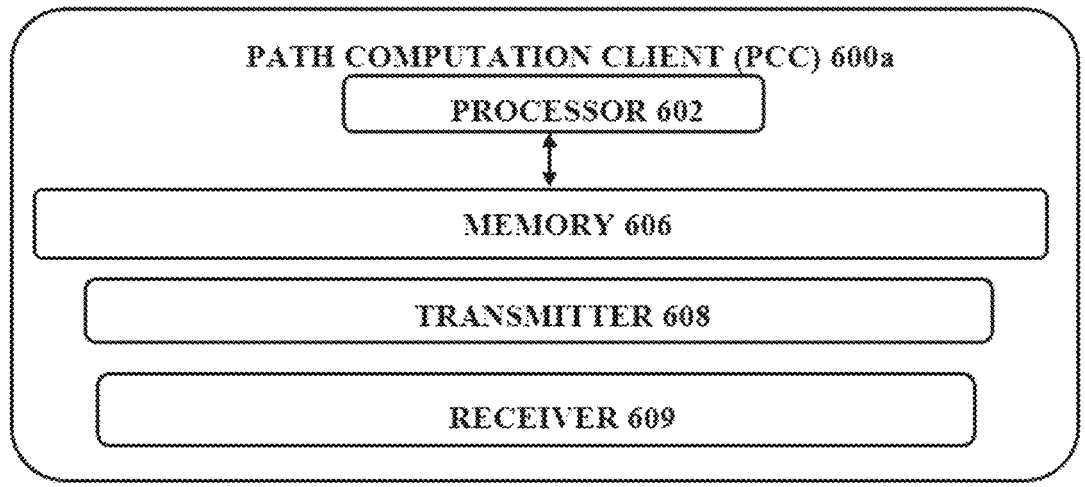
FIG. 6A illustrates a schematic structural diagram of a path computation client (PCC) according to the embodiment of the present invention.

Referring now to FIG. 6A, a schematic structural diagram of a Path Computation Client (PCC) is illustrated according to the embodiment of the present invention.

In one detailed embodiment of the present invention, the PCC 600a includes a processor 602, a memory 606, and an interconnection mechanism coupling the memory 606, a transmitter 608 and receiver 609.

The processor 602 may be implemented as one or more microprocessors, microcomputers, microcontrollers, digital signal processors, central processing units, state machines, logic circuitries, and/or any devices that manipulate signals based on operational instructions. Among other capabilities, at least one processor 602 is configured to fetch and execute computer-readable instructions stored in the memory 606.

The transmitter 608 and receiver 609 may allow the PCC 600a to interact with a user directly or through the PCC 600a. Further, the transmitter 608 and receiver 609 may enable the PCC 600a to communicate with other computing devices, such as web servers and external data servers (not shown). The transmitter 608 and receiver 609 can facilitate multiple communications within a wide variety of networks and protocol types, including wired networks, for example, LAN, cable, etc., and wireless networks, such as WLAN, cellular, or satellite. The transmitter 608 and receiver 609 may include one or more ports for connecting a number of devices to one another or to another server.

The memory 606 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 606 may include modules (not shown) and data (not shown).

In one embodiment, the processor is configured to generate one or more path computation element communication protocol (PCEP) messages to report an association information, wherein the PCEP message comprise one or more characteristics associated with a level of protection of a protection label switch path (LSP). Upon generation of the PCEP message, the transmitter is configured to transmit the one or more PCEP messages to the PCE) for path computation.

In one implementation, the one or more characteristics is a type of association of the Protection LSP with a Working LSP, the type of association is selected from a group comprising: a shared risk link group (SRLG) disjoint path or link disjoint path or node disjoint path or bandwidth or best effort path or any combination thereof. The association information is reported using one or more association objects comprising one or more Working LSPs and one or more Protection LSPs. The association objects include path protection association Type Length Value (TLV) as an optional TLV.

In one implementation, the one or more characteristics are the level of protection of the Protection LSP with a Working LSP, wherein the characteristics are optionally transmitted/reported to the PCE. With these optional characteristics the PCE is adapted to compute the path. The characteristic comprises one or more of (1) that the Protection LSP is shared risk link group (SRLG) disjoint with the working LSP, (2) that the Protection LSP is link disjoint with the working LSP, (3) that the Protection LSP is node disjoint with the working LSP, (4) that the Protection LSP is bandwidth protected with the working LSP, and (5) that the Protection LSP is best effort disjointed with the working LSP.

In one implementation, the PCEP message includes a Label Switch Path Attributes (LSPA) object field including one or more characteristics associated with the level of protection of the Protection LSP. The LSPA object includes an attribute TLV field and the V field of the TLV field includes an array of units of flags numbered from the least significant bit, where each bit represents the one or more characteristics associated with the level of protection of the Protection LSP. The PCEP message field includes a TLV field, wherein the V field of the TLV field includes an array of units of flags numbered from the least significant bit, where each bit represents the one or more characteristics associated with the level of protection of the protection LSP. The PCEP message is selected from a path computation request (PCReq) message or a path computation reply (PCRep) message or a path computation report (PCRpt) message. The PCEP message is a Path Computation Request (PCReq) message, and the association object associates the path computation request to an association group.

Figure 6B:
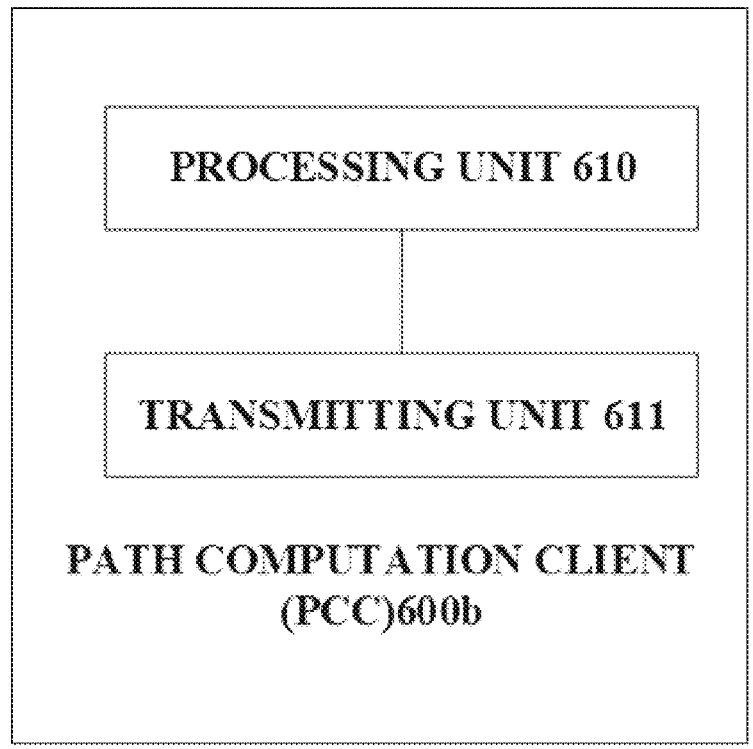
FIG. 6B illustrates a schematic structural diagram of a path computation client (PCC) according to the embodiment of the present invention.

Referring now to FIG. 6B, a schematic structural diagram of a Path Computation Client (PCC) 600b is illustrated according to the embodiment of the present invention.

In one detailed embodiment of the present invention, the PCC 600*b* includes a transmitting unit 610 and a processing unit 611.

The processing unit 611 is configured to generate a path computation element communication protocol (PCEP) message to report an association information, wherein the PCEP message comprise at least one of characteristics associated with a level of protection for a protection label switch path (LSP).

The transmitting unit 610 is configured to transmit the PCEP message to the PCE for path computation.

In a possible implementation, the characteristic comprises one or more of (1) that the Protection LSP is shared risk link group (SRLG) disjoint with the working LSP, (2) that the Protection LSP is link disjoint with the working LSP, (3) that the Protection LSP is node disjoint with the working LSP, (4) that the Protection LSP is bandwidth protected with the working LSP, and (5) that the Protection LSP is best effort disjointed with the working LSP or any combination thereof.

In a possible implementation, the PCEP message comprises an association object, the association object includes a path protection association-flag Type Length Value (TLV) field, the path protection association-flag TLV field is configured to carry the at least one of characteristics.

In a possible implementation, the PCEP message comprises a Label Switch Path Attributes (LSPA) object field, the LSPA object includes an attribute TLV field, and the attribute TLV field of the LSPA object is configured to carry the at least one of characteristics.

In a possible implementation, the PCEP message comprises a Label Switch Path Attributes (LSPA) object field, the LSPA object includes an attribute TLV field, and the attribute TLV field of the LSPA object is configured to carry the at least one of characteristics.

In a possible implementation, the PCEP message is selected from a path computation request (PCReq) message or a path computation report (PCRpt) message.

Figure 7A:
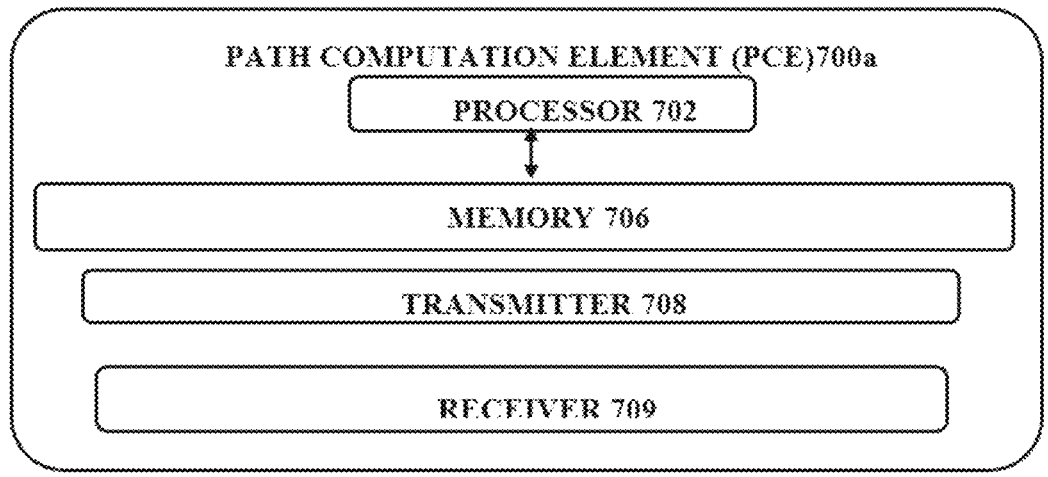
FIG. 7A illustrates a schematic structural diagram of a path computation element (PCE) according to the embodiment of the present invention.

Referring now to FIG. 7A schematic structural diagram of a Path Computation Element (PCE) is illustrated according to the embodiment of the present invention.

In one detailed embodiment of the present invention, the PCE 700*a* includes a processor 702, a memory 706, and an interconnection mechanism coupling the memory 706, a transmitter 708 and a receiver 709.

The details of the processor 702, a transmitter 708 and a receiver 709, and the memory 706, are same as that of explained in the details of the processor 602, the transmitter 608 and receiver 609, and the memory 606, and is not repeated in the detailed embodiment of the PCE 700*a*.

In one embodiment, the processor is configured to generate one or more path computation element communication protocol (PCEP) messages, wherein the PCEP message comprise one or more characteristics associated with a level of protection for a protection label switch Path (LSP). Upon generation of the PCEP message, the transmitter is configured to transmit the one or more PCEP messages to one or more Path Computation Client (PCC), to set up the Protection LSP, and report association information to the PCE.

In one implementation, the one or more characteristics associated with the level of protection for the Protection LSP are transmitted in an association object along with the PCEP message. The PCEP message is selected from an update (PCUpd) message or an initiate (PCInitiate) message. The association information is reported to the PCE, in an association object, using a report (PCRpt) message. The one or more characteristics is a type of association of the Protection LSP with a Working LSP, the type of association is selected from a group comprising: the Protection LSP is shared risk link group (SRLG) disjoint with the working LSP or the Protection LSP is link disjoint with the working LSP or the Protection LSP is node disjoint with the working LSP or the Protection LSP is bandwidth protected with the working LSP or the Protection LSP is best effort disjointed with the working LSP or any combination thereof.

In one implementation, the one or more characteristics is the level of protection of the Protection LSP with a Working LSP are optionally transmitted/reported to the PCE. With these optional characteristics the PCE is adapted to compute the path. The characteristic may comprise one or more of (1) that the Protection LSP is shared risk link group (SRLG) disjoint with the working LSP, (2) that the Protection LSP is link disjoint with the working LSP, (3) that the Protection LSP is node disjoint with the working LSP, (4) that the Protection LSP is bandwidth protected with the working LSP, and (5) that the Protection LSP is best effort disjointed with the working LSP.

Figure 7B:
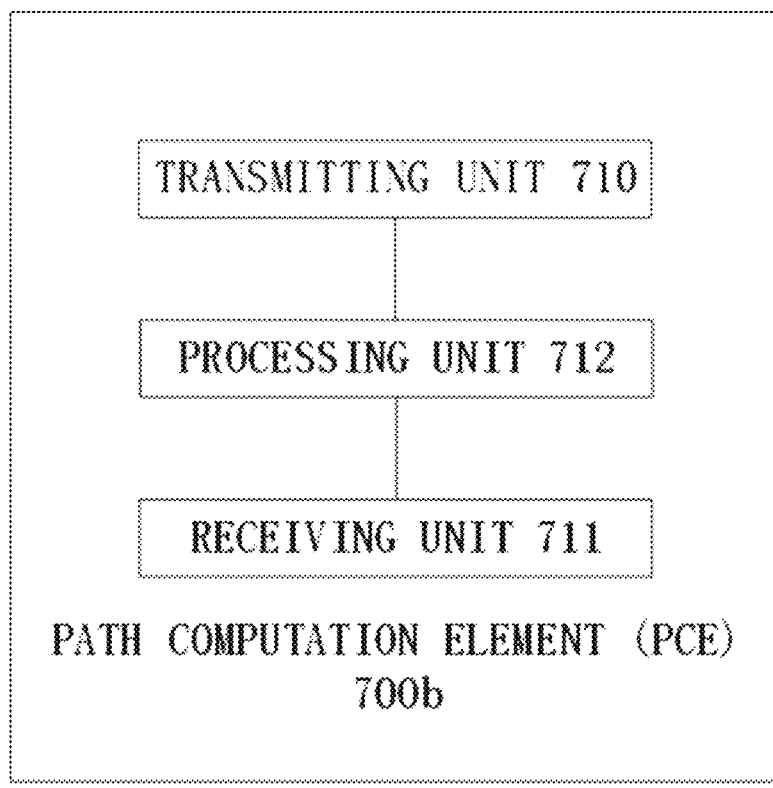
FIG. 7B illustrates a schematic structural diagram of a path computation element (PCE) according to the embodiment of the present invention.

Referring now to FIG. 7B schematic structural diagram of a Path Computation Element (PCE) is illustrated according to the embodiment of the present invention.

In one detailed embodiment of the present invention, the PCE 700*b* includes a transmitting unit 710, a receiving unit 711 and a processing unit 712.

The processing unit 712 is configured to generate a path computation element communication protocol (PCEP) message, wherein the PCEP message comprise at least one of characteristics associated with a level of protection of a protection label switch Path (LSP).

The transmitting unit 710 is configured to transmit the PCEP message to a Path Computation Client (PCC), to set up the Protection LSP.

The receiving unit 711 is configured to receive a path computation report (PCRpt) message from the PCC, wherein the PCRpt message is configured to report at least one of characteristics associated with a level of protection of the Protection LSP set up by the PCC.

In a possible implementation, the PCEP message comprises an association object, the association object includes a path protection association-flag Type Length Value (TLV) field, the path protection association-flag TLV field is configured to carry the at least one of characteristics.

In a possible implementation, the PCEP message is selected from an update (PCUpd) message or an initiate (PCInitiate) message.

In a possible implementation, the PCRpt message comprises an association object, the association object is configured to carry the at least one of characteristics associated with a level of protection of the protection LSP set up by the PCC.

In a possible implementation, the characteristic comprises one or more of (1) that the Protection LSP is shared risk link group (SRLG) disjoint with the working LSP, (2) that the Protection LSP is link disjoint with the working LSP, (3) that the Protection LSP is node disjoint with the working LSP, (4) that the Protection LSP is bandwidth protected with the working LSP, and (5) that the Protection LSP is best effort disjointed with the working LSP.

Referring now to FIG. 8*a* schematic diagram of an application scenario of the method is illustrated according to the embodiment of the present invention. The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, software, firmware, or combination thereof. However, for ease of explanation, in the embodiments described below, the method may be considered to be implemented in the above described PCC 600*a* or PCC 660*b*/PCE 700*a* or PCE 700*b*.

The following describes the method in combination with FIG. 6A/6B and FIG. 7A/7B, however the embodiments of the present invent are not limited to this.

The method performed by the PCC 600*a* or 600*b* includes the below steps:

S802: one or more path computation element communication protocol (PCEP) messages are generated to report association information. The PCEP message includes one or more characteristics associated with a level of protection of a Protection LSP.

In one implementation, the one or more characteristics is a type of association of the Protection LSP with a Working LSP, the type of association is selected from a group comprising: the Protection LSP is shared risk link group (SRLG) disjoint with the working LSP or the Protection LSP is link disjoint with the working LSP or the Protection LSP is node disjoint with the working LSP or the Protection LSP is bandwidth protected with the working LSP or the Protection LSP is best effort disjointed with the working LSP or any combination thereof. The association information is reported using one or more association objects comprising one or more Working LSPs and one or more Protection LSPs. The association objects include path protection association Type Length Value (TLV) as an optional TLV.

In one implementation, the PCEP message includes a Label Switch Path Attributes (LSPA) object field including one or more characteristics associated with the level of protection for the Protection LSP. The LSPA object includes an attribute TLV field and the V field of the TLV field includes an array of units of flags numbered from the least significant bit, where each bit represents the one or more characteristics associated with the level of protection for the Protection LSP. The PCEP message field includes a TLV field, wherein the V field of the TLV field includes an array of units of flags numbered from the least significant bit, where each bit represents the one or more characteristics associated with the level of protection for the Protection LSP. The PCEP message is selected from a path computation request (PCReq) message or a path computation reply (PCRep) message or a path computation report (PCRpt) message. The PCEP message is a Path Computation Request (PCReq) message, and the association object associates the path computation request to an association group.

In one implementation, in order to convey the characteristics associated with a level of protection of the Protection LSP between PCC and PCE, a path protection association TLV is provided. The format of the path protection association TLV is shown in FIG. 4. Following bits may be defined in the Path Protection Association TLV in FIG. 4.

N bit represents—a Protection LSP is node disjoint with a Working LSP.

L bit represents—a Protection LSP is link disjoint with Working LSP.

S bit represents—a Protection LSP is SRLG (Shared Risk Link Group) disjoint with a Working LSP.

B bit represents—a Protection LSP is bandwidth protected with a Working LSP.

E bit represents—a Protection LSP is best effort disjointed with a Working LSP.

S804: the one or more PCEP messages are transmitted to one or more Path Computation Element (PCE) for path computation.

Figure 8:
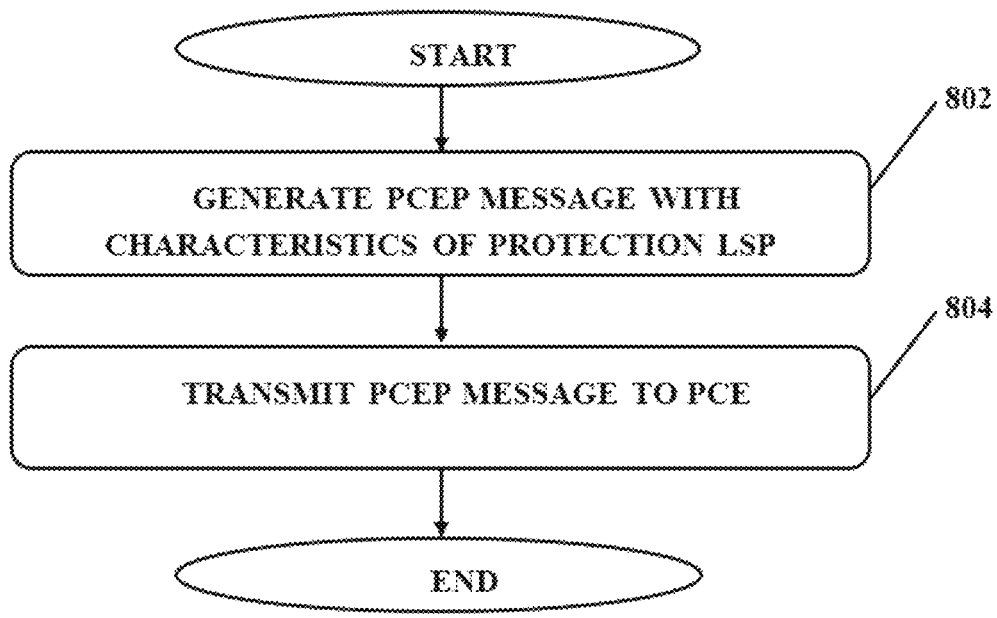
FIG. 8 illustrates a schematic diagram of an application scenario of the method according to the embodiment of the present invention.
Figure 9:
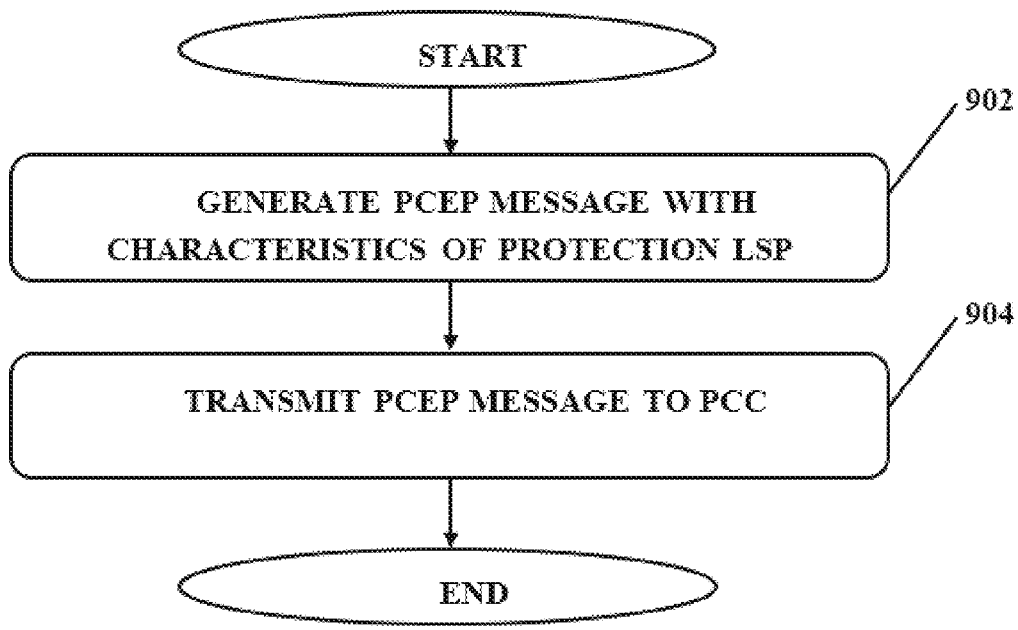
FIG. 9 illustrates a schematic diagram of an application scenario of the method according to the embodiment of the present invention.

When using the method according to the FIG. 8, the PCC may specify the level of protection for Protection LSP while delegating/reporting Protection LSP to PCE.

In one implementation, a method 900 performed by the PCE 700*a* or 700*b* includes the below steps:

S902: one or more path computation element communication protocol (PCEP) messages are generated. The PCEP message includes one or more characteristics associated with a level of protection for a protection label switch Path (LSP). In one implementation, PCE initiated LSPs, PCE will initiate the Working LSP and protection LSP on PCC node. So PCInit/PCUpd can contain association with path protection association TLV carrying these characteristics defined. In response to PCInit/PCUpd, PCC will send a report to PCE back.

In one implementation, the one or more characteristics associated with the level of protection for the Protection LSP are transmitted in an association object along with the PCEP message. The PCEP message is selected from an update (PCUpd) message or an initiate (PCInitiate) message. The association information is reported to the PCE, in an association object, using a report (PCRpt) message. The one or more characteristics is a type of association of the Protection LSP with a Working LSP, the type of association is selected from a group comprising: a shared risk link group (SRLG) disjoint path or link disjoint path or node disjoint path or bandwidth or best effort path or any combination thereof.

In one implementation, the one or more characteristics are the level of protection of the Protection LSP with a Working LSP are optionally transmitted/reported to the PCE. With these optional characteristics the PCE is adapted to compute the path. Characteristics—being selected from a group comprising: a shared risk link group (SRLG) disjoint path or link disjoint path or node disjoint path or bandwidth or best effort path or any combination thereof.

In one implementation, in order to convey the characteristics of the Protection LSP between PCC and PCE, and to specify the level of protection, accordingly, a path protection association TLV format with new bits defined above is as shown in FIG. 4. Following bits may be defined in Path Protection Association TLV.

N bit represents—Protection LSP is node disjoint with Working LSP.

L bit represents—Protection LSP is link disjoint with Working LSP.

S bit represents—Protection LSP is SRLG (Shared Risk Link Group) disjoint with Working LSP.

B bit represents—Protection LSP is bandwidth protected with Working LSP.

E bit represents—Protection LSP is best effort disjointed with Working LSP.

S904: the one or more PCEP messages generated is transmitted to one or more Path Computation Client (PCC) to set up the Protection LSP, and report association information to the PCE.

When using the method, the PCC can specify the level of protection for Protection LSP while delegating/reporting Protection LSP to PCE upon change in association information. This delegation is done via sending PCRpt message. In this case also, PCRpt has the characteristics. In this case, via PCRpt msg, PCE will be aware of that PCC desired LSP constraints and characteristics for that particular LSP. So PCE can later compute the new LSP considering them and send PCUpd to that LSP If LSP has to be modified.

In one implementation, a method is disclosed. The method includes communicating one or more characteristics of associated with a level of protection of a protection label switch Path (LSP) between Path Computation Client (PCC) and a Path Computation Element (PCE) using a path protection association TLV within an association object of one or more path computation element communication protocol (PCEP) messages. The one or more characteristics is a type of association of the Protection LSP with a Working LSP, the type of association is selected from a group comprising: the Protection LSP is shared risk link group (SRLG) disjoint with the working LSP or the Protection LSP is link disjoint with the working LSP or the Protection LSP is node disjoint with the working LSP or the Protection LSP is bandwidth protected with the working LSP or the Protection LSP is best effort disjointed with the working LSP or any combination thereof. The PCEP message field includes a TLV field, wherein the V field of the TLV field includes an array of units of flags numbered from the least significant bit, where each bit represents the one or more characteristics associated with the level of protection for the Protection LSP.

In one implementation, in case of PCE initiated Protection LSP, PCE may specify the characteristics of the Protection LSP in association object in Update (PCUpd) or Initiate (PCInitiate) message to PCC, and PCC set up the Protection LSP and report the association information via association object to PCE through PCRpt message.

In one implementation, in case of passive stateful or stateless PCE, PCC can specify these characteristics in association object which is optional and may be carried in the Path Computation Request (PCReq) message. When it is carried in a request message, the association object is used to associate the path computation request to an association group, the association might be further informed by PCC via report (PCRpt) message to PCE in case of passive stateful PCE later when LSP set up is finished.

Although the present subject matter is explained considering that the present invention is implemented as the PCC 600 or PCE 700, it may be understood that the PCC 600 or PCE 700 may also be implemented in a variety of computing systems, such as a laptop computer, a desktop computer, a notebook, a workstation, a mainframe computer, a server, a network server, and the like. It will be understood that the PCC 600 or PCE 700 may be accessed by multiple users through one or more user devices (not shown), collectively referred to as user hereinbefore/after, or applications residing on the user devices. Examples of the PCC 600 or PCE 700 may include, but are not limited to, a router, a switch, a controller in a SDN, a portable computer, a personal digital assistant, a handheld device, and a workstation. The PCC 600 and PCE 700 are communicatively coupled to with each other through a network (not shown).

In one implementation, the network may be a wireless network, a wired network or a combination thereof. The network can be implemented as one of the different types of networks, such as intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including network devices, bridges, servers, computing devices, storage devices, and the like.

A person skilled in the art may understand that any known or new algorithms by be used for the implementation of the present invention. However, it is to be noted that, the present invention provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiment of the present invention. The foregoing storage medium includes: any medium that can store program code, such as a USB flash drive, a removable hard disk, a read-only memory (ROM), a random-access memory (RAM), a magnetic disk, or an optical disc.

Devices those are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Although implementations for method and apparatus for path computation have been described in language specific to structural features and/or methods, it is to be understood that the appended claims are not necessarily limited to the specific features or methods described. Rather, the specific features and methods are disclosed as examples of implementations of the method and apparatus for path computation.

What is claimed is:

1. A method comprising:
generating a Path Computation Element Communication Protocol (PCEP) message indicating a characteristic associated with an association group, wherein the characteristic is at least one of label-switched paths (LSPs) associated with the association group do not share a shared risk link group (SRLG), the LSPs are link disjoint with each other, the LSPs are node disjoint with each other, or the LSPs are best effort disjoint with each other; and
transmitting the PCEP message, wherein the PCEP message comprises an object including a type-length-value (TLV) field indicating the characteristic.

2. The method of claim 1, wherein the object is an association object.

3. The method of claim 1, wherein the TLV field comprises at least one of an S bit indicating that the LSPs do not share the SRLG, an L bit indicating that the LSPs are link disjoint with each other, an N bit indicating that the LSPs are node disjoint with each other, or an E bit indicating that the LSPs are best effort disjoint with each other.

4. The method of claim 1, wherein the PCEP message is a path computation request (PCReq) message or a path computation report (PCRpt) message.

5. The method of claim 1, wherein the method is implemented by a path computation client (PCC).

6. The method of claim 1, wherein the method is implemented by a path computation element (PCE).

7. A communications apparatus comprising:
a processor configured to generate a Path Computation Element Communication Protocol (PCEP) message indicating a characteristic associated with an association group, wherein the characteristic is at least one of label-switched paths (LSPs) associated with the association group do not share a shared risk link group (SRLG), the LSPs are link disjoint with each other, the LSPs are node disjoint with each other, or the LSPs are best effort disjoint with each other; and
a transmitter coupled to the processor and configured to transmit the PCEP message, wherein the PCEP message comprises an object including a type-length-value (TLV) field indicating the characteristic.

8. The communications apparatus of claim 7, wherein the object is an association object.

9. The communications apparatus of claim 7, wherein the TLV field comprises at least one of an S bit indicating that the LSPs do not share the SRLG, an L bit indicating that the LSPs are link disjoint with each other, an N bit indicating that the LSPs are node disjoint with each other, or an E bit indicating that the LSPs are best effort disjoint with each other.

10. The communications apparatus of claim 7, wherein the PCEP message is a path computation request (PCReq) message or a path computation report (PCRpt) message.

11. The communications apparatus of claim 7, wherein the communications apparatus is a path computation client (PCC).

12. The communications apparatus of claim 7, wherein the communications apparatus is a path computation element (PCE).

13. A communications system comprising:
a first communications apparatus comprising:
a processor configured to:
generate a Path Computation Element Communication Protocol (PCEP) message indicating a characteristic associated with an association group, wherein the characteristic comprises at least one of label-switched paths (LSPs) associated with the association group do not share a shared risk link group (SRLG), the LSPs are link disjoint with each other, the LSPs are node disjoint with each other, or the LSPs are best effort disjoint with each other; and
a processor coupled to the processor and configured to transmit the PCEP message; and
a second communications apparatus configured to receive the PCEP message from the first communications apparatus, wherein the PCEP message comprises an object including a type-length-value (TLV) field indicating the characteristic.

14. The communications system of claim 13, wherein the TLV field comprises an S bit indicating that the LSPs do not share the SRLG.

15. The communications system of claim 13, wherein the PCEP message is a path computation request (PCReq) message or a path computation report (PCRpt) message.

16. The communications system according to claim 13, wherein the first communications apparatus is a path computation client (PCC), and wherein the second communications apparatus is a path computation element (PCE).

17. The communications system according to claim 13, wherein the first communications apparatus is a path computation element (PCE), and wherein the second communications apparatus is a path computation client (PCC).

18. The communications system of claim 13, wherein the TLV field comprises an L bit indicating that the LSPs are link disjoint with each other.

19. The communications system of claim 13, wherein the TLV field comprises an N bit indicating that the LSPs are node disjoint with each other.

20. The communications system of claim 13, wherein the TLV field comprises an E bit indicating that the LSPs are best effort disjoint with each other.

* * * * *